UNITED STATES PATENT OFFICE.

EMIL ELSAESSER, OF BARMEN, PRUSSIA, GERMANY.

RED DYE-STUFF OR COLORING-MATTER.

SPECIFICATION forming part of Letters Patent No. 329,634, dated November 3, 1885.

Application filed June 14, 1884. Serial No. 134,875. (Specimens.) Patented in Germany March 2, 1884, No. 29,084, and in England May 14, 1884, No. 7,713.

*To all whom it may concern:*

Be it known that I, EMIL ELSAESSER, of Barmen, in the Kingdom of Prussia and Empire of Germany, have invented certain new and useful Improvements in Dye-Stuffs or Coloring-Matters, of which the following is a specification.

This invention relates to red coloring-matters or dye-stuffs which result from the action of the diazo compound of the hereinafter-described sulpho-acid of beta-naphthylamine upon alkaline solutions of sulpho-acids of alpha-naphthol.

In preparing the sulpho-acid of beta-naphthylamine, I mix one part of beta-naphthylamine with three parts of fuming sulphuric acid, and heat this mixture to a temperature of about 75° centigrade. As soon as, by means of testing, it is shown to be soluble in alkaline solutions, as is the case after about an hour, this sulpho-acid is formed, which I then pour into water and separate the nearly-insoluble portions from the soluble parts in a manner well known to chemists. The mixture thus obtained contains three different sulpho acids, from which I obtain my new sulpho-acid of beta-naphthylamine in the following manner: I transform the sulpho-acids into their sodium salts and dry them carefully. The sodium salts are then boiled during an hour with six parts of alcohol of 93° to 96° Tralles, by which proceedings about sixty to seventy per cent. of the salts are dissolved. The alcoholic solution is then separated from the insoluble part by filtration, and the undissolved salt is obtained after having evaporated the alcohol. This salt contains the new sulpho-acid, besides very small quantities of another sulpho-acid. The salt thus obtained may immediately be used.

To obtain the acid quite pure, I dissolve the mixture of the salts extracted, by water, and precipitate the sulpho-acids by muriatic acid. I then transform the acids into their barium salts. Small quantities of a very difficultly soluble barium salt precipitate. The principal part remains dissolved. This barium salt remaining dissolved contains the new sulpho-acid of beta-naphthylamine from which I obtain, in a manner well known to chemists, its sodium salt.

In preparing the coloring-matters, I dissolve one part of the above-mentioned sodium salt of this monosulpho-acid of beta-naphthylamine, or of the aforementioned mixture of it, with small quantities of the other sulpho-acid in twenty parts of cold water, and then add 1.5 parts of muriatic acid of the specific gravity of 1.15, and after this twenty-two parts of a fifteen-per-cent. solution of nitrate of sodium which is added according to well-known rules for preparing the diazo compound, which is termed, in chemical language, "sulpho-acid of beta-diazo-naphthylamine." This solution is mixed with another solution which is produced by mixing one part of the sodium salt of one of the monosulpho-acids of alpha-naphthol with 0.5 parts of caustic soda and thirty parts of water, care being taken to maintain the mixture at a temperature of about 6° to 8° centigrade. From this mixture the coloring-matter is then precipitated by common salt. The precipitate is compressed and then redissolved in boiling water, and finally dried.

The sulpho-acids of alpha-naphthol are prepared in a manner well known to chemists, and described by Nevile and Winther and Neve, by boiling the diazo compounds of monosulpho-acids of alpha-naphthylamine with acidulated water.

The dye-stuff obtained by mixing the diazo compound of my new monosulpho-acid of beta-naphthylamine with the monosulpho-acid of alpha-naphthol derived from the naphthionic acid dyes scarlet. That which is obtained with the monosulpho-acid of alpha-naphthol derived from the sulpho-naphthyladamic acid of Laurent dyes a reddish-blue shade.

The new dye-stuff exists as a reddish-brown powder, easily soluble in hot water. The water solution of the dye-stuff, if prepared as described from beta-naphthylamine, monosulpho-acid, and alpha-naphthol monosulpho-acid, has a scarlet color. If made from alpha-naphthol monosulpho-acid and sulpho-naphthyladamic acid, it has a bluish-red color. The addition of sulphuric acid to a water solution of the new dye-stuff does not change the color of the solution. If, however, it be added to the dry powder, the latter dissolves, producing a red solution. The water solution of the new dye-stuff, when boiled with zinc-dust, decolorizes, but changes after some time to a bluish color. If to this a sufficient quantity of hydrochloric acid is added, a precipitate forms consisting of the regenerated beta-naphthylamine monosulpho-acid, which can be recognized by the following reactions: The free acid dissolves sparingly in cold or hot water, and is insoluble in alcohol. The dissolved part crystallizes from such solutions in needles or scales. The free acid is almost soluble in alcohol. The soda salt of this acid dissolves readily in ninety-five (95) per cent. of alcohol. When boiling, the water solution of this salt shows fluorescence of a reddish-blue color. The lime or barium salts of this acid are easily soluble in water, but crystallize only from a strongly-concentrated solution. By means of nitrite of sodium or potassium the acid is easily converted into its diazo compound, which is a yellow color, and only dissolves in large quantities of water. If the solution of the reduced dye-stuff is boiled with nitric acid, it assumes a yellow color. The chemical constitution of the new dye-stuff above described may be expressed by the following formula:

$$NaSO_3C_{10}H_6N; NC_{10}H_5SO_3Na$$
$$(B) \qquad\qquad OH(d)$$

I do not here claim the new sulpho-acid above referred to, but

What I claim as new, and desire to secure by Letters Patent, is—

The new artificial coloring-matter herein described, obtained by the reaction of the diazoic derivate of the within-described monosulpho-acid of beta-naphthylamine, and the monosulpho-acids of alpha-naphthol derived from naphthionic acid and sulpho-naphthyladamic acid, and having the characteristics and qualities herein described.

In testimony whereof I have signed my name to this specification in the presence of two subscribing witnesses.

EMIL ELSAESSER.

Witnesses:
A. DAUL,
F. GAESS.